United States Patent
Gal et al.

(10) Patent No.: US 12,143,913 B1
(45) Date of Patent: Nov. 12, 2024

(54) METHODS AND SYSTEMS FOR SENDING SENSOR DATA USING A DYNAMIC CONNECTION SETTING

(71) Applicant: Samsara Inc., San Francisco, CA (US)

(72) Inventors: David Gal, Oakland, CA (US); Gautam Ramaswamy, Monmouth Junction, NJ (US); Eli Peer, San Carlos, CA (US); Anubhav Jain, Lexington, MA (US)

(73) Assignee: Samsara Inc., San Francisco, CA (US)

( * ) Notice: Subject to any disclaimer, the term of this patent is extended or adjusted under 35 U.S.C. 154(b) by 78 days.

(21) Appl. No.: 17/804,065

(22) Filed: May 25, 2022

Related U.S. Application Data

(60) Provisional application No. 63/265,682, filed on Dec. 17, 2021, provisional application No. 63/265,680, filed on Dec. 17, 2021.

(51) Int. Cl.
*H04W 4/80* (2018.01)
*H04W 84/18* (2009.01)

(52) U.S. Cl.
CPC .............. *H04W 4/80* (2018.02); *H04W 84/18* (2013.01)

(58) Field of Classification Search
CPC ......... H04W 4/80; H04W 4/38; H04W 88/16; H04W 76/10; H04W 88/02
See application file for complete search history.

(56) References Cited

U.S. PATENT DOCUMENTS 10,097,379 B2 * 10/2018 Nolan ...................... H04L 12/66
11,343,831 B2 * 5/2022 Wegelin ............ H04W 72/0453

* cited by examiner

*Primary Examiner* — Tuan H Nguyen
(74) *Attorney, Agent, or Firm* — Nicholson, De Vos, Webster & Elliott, LLP

(57) ABSTRACT

A method performed by a wireless sensing device to send sensor data to a gateway device using a dynamic connection setting. The method includes establishing a connection with the gateway device, wherein the connection is configured to have a first connection setting that allows for higher data throughput compared to a second connection setting, upon the connection being established, sending backlogged sensor data stored in a data storage of the wireless sensing device to the gateway device over the connection using the first connection setting, configuring the connection to have the second connection setting in response to a determination that the backlogged sensor data has been sent to the gateway device, and sending new sensor data generated after the backlogged sensor data to the gateway device over the connection using the second connection setting.

13 Claims, 11 Drawing Sheets

METHODS AND SYSTEMS FOR SENDING SENSOR DATA USING A DYNAMIC CONNECTION SETTING

CROSS-REFERENCE TO RELATED APPLICATIONS

This application claims the benefit of U.S. Provisional Application No. 63/265,680, titled METHODS AND SYSTEMS FOR SENDING SENSOR DATA USING A DYNAMIC CONNECTION SETTING, filed Dec. 17, 2021, and U.S. Provisional Application No. 63/265,682, titled METHODS AND SYSTEMS FOR SENDING SENSOR DATA IN ADVERTISEMENT MESSAGES, filed Dec. 17, 2021, which are hereby incorporated by reference. This application is related to U.S. application Ser. No. 17/804,066, filed May 25, 2022 which also claims the benefit of U.S. Provisional Application Nos. 63/265,680 and 63/265,682, filed Dec. 17, 2021, which is hereby incorporated by reference.

FIELD

Embodiments of the invention relate to the field of sensor networks, and more specifically, to sending sensor data using a dynamic connection setting.

BACKGROUND

Some sensor network deployments use a short-range wireless communication protocol such as Bluetooth Low Energy (BLE) to send sensor data from wireless sensing devices (WSDs) to gateway devices (also referred to simply as gateways). The gateway devices may be connected to a management server over a wide area network and send the sensor data received from the WSDs to the management server. The management server may store the sensor data and make it accessible to an end user device.

Some sensor networks may be deployed in environments where the WSDs are not always able to maintain a connection with a gateway device. A WSD may not be able to maintain a connection with a gateway device for various reasons including, for example, being out of range of the gateway device, radio frequency interference, and the presence of physical obstacles (e.g., concrete walls, objects with high water content, etc.). The WSD may continue to record sensor measurements even when it is not connected to a gateway device and store sensor data indicative of those sensor measurements in its local data storage until the WSD is able to establish a connection with a gateway device. Once the WSD is able to establish a connection with a gateway device, the WSD may send the sensor data stored in its local data storage ("backlogged" sensor data) to the gateway device over the connection. In sensor network deployments in which the WSDs and/or gateway devices are battery powered, connections between WSDs and gateway devices are often optimized for power savings, and thus might have a relatively low data throughput. As a result, it may take a long time for the WSD to send the backlogged sensor data to the gateway device, during which the gateway device is prevented from being able to perform other tasks or entering a lower power state.

Radio asymmetry may exist in some sensor networks, where WSDs have higher transmit power than the gateway devices. This radio asymmetry may result in the gateway devices being able to receive messages sent by the WSDs but the WSDs not being able to receive messages sent by the gateway devices. Such radio asymmetry may make it difficult for WSDs and gateway devices to establish connections with each other and also make it difficult for WSDs and gateway devices to maintain connections once they have been established. This may result in lower overall data throughput in the sensor network and/or the gateway devices not being able to receive critical sensor data from WSDs in a timely manner.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
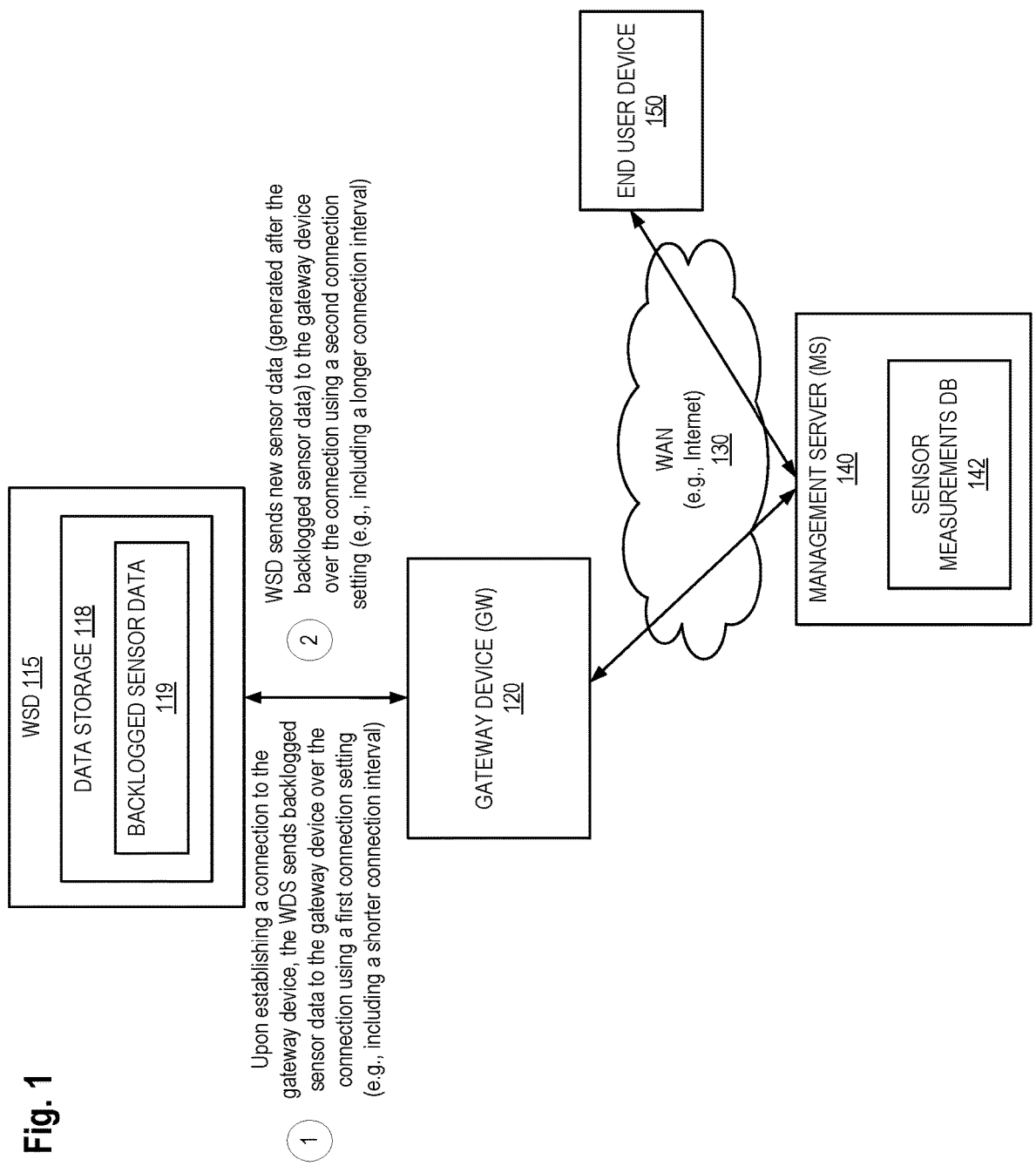
FIG. 1 illustrates a block diagram of an example sensor network in which a wireless sensing device (WSD) may send sensor data to a gateway device using a dynamic connection setting, in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments are described herein that use a dynamic connection setting approach to send sensor data from a WSD to a gateway device, where the WSD uses a "faster" connection setting to send backlogged sensor data to the gateway device when the WSD initially establishes a connection with the gateway device, and then switches to using a "slower" (but more power efficient) connection setting to send new sensor data to the gateway device over the connection. An example embodiment is a method by a WSD to send sensor data to a gateway device using a dynamic connection setting. The method includes establishing a connection with the gateway device, wherein the connection is configured to have a first connection setting that allows for higher data throughput compared to a second connection setting, upon the connection being established, sending backlogged sensor data stored in a data storage of the WSD to the gateway device over the connection using the first connection setting, configuring the connection to have the second connection setting in response to a determination that the backlogged sensor data has been sent to the gateway device, and sending new sensor data generated after the backlogged sensor data to the gateway device over the connection using the second connection setting. An advantage of this approach is that it allows the gateway device to quickly receive backlogged sensor data from a WSD and thus allows the gateway device to switch to performing other tasks (e.g., receiving backlogged sensor data from other WSDs or sending sensor data to a management server) or enter a lower power state sooner. Another advantage of this approach is that backlogged sensor data can be ingested more quickly so that the data can be sent to other systems (e.g., an alerting system) sooner.

Embodiments are described herein that use an approach in which WSDs that are not connected to a gateway include sensor data in advertisement messages. An example embodiment is a method by a WSD to send sensor data to a gateway device in advertisement messages. The method includes sending non-connectable advertisement messages and connectable advertisement messages when the WSD is not connected with the gateway device, wherein the non-connectable advertisement messages include sensor data indicative of sensor measurements recorded by the WSD. An advantage of this approach is that it allows a gateway device to potentially receive some sensor data from the WSD even when the WSD and the gateway device are not able to establish a connection with each other (e.g., because of radio asymmetry, where the gateway device is able to receive messages sent by the WSD but the WSD is not able to receive messages sent by the gateway device).

According to some embodiments, a WSD may use the approach of including sensor data in advertisement messages when the WSD is not connected to a gateway and use the dynamic connection setting approach when the WSD establishes a connection with a gateway, which may confer the advantages of both approaches. Embodiments will now be described with reference to the accompanying figures.

FIG. 1 illustrates a block diagram of an example sensor network in which a WSD may send sensor data to a gateway device using a dynamic connection setting, in accordance with some embodiments. The sensor network 100 includes a WSD 115, a gateway device 120, a management server 140, and an end user device 150. The WSD 115 may intermittently connect to the gateway device 120 to send sensor data to the gateway device 120. The gateway device 120 may intermittently connect to the management server 140 over a wide area network (WAN) 130. The management server 140 may be communicatively coupled with the end user device 150 through the WAN 130. In one embodiment, the WAN 130 is the Internet.

The WSD 115 may be an electronic device that includes one or more sensors for measuring physical properties in its surrounding environment (e.g., temperature, humidity, barometric pressure, $CO_2$ concentration, acceleration, pressure, sound, movement, the presence of cargo in a trailer, door state (e.g., whether the door is open or closed), vibration, etc.) and recording sensor measurements in response to the measuring the physical properties. The WSD 115 may be attachable to an object for measuring and recording sensor measurements related to the object (e.g., changes in the temperature of an object, movement of an object (e.g., a door being closed/opened), sudden accelerations of an object, etc.). The WSD 115 may record sensor measurements at regular intervals of time (e.g., the WSD 115 may record the temperature of a room or an object (e.g., refrigerator, food product) every N seconds or minutes) and/or when there has been a significant change in sensor measurement since the previous sensor measurement. For example, the WSD 115 may sample the temperature every four seconds and record temperature measurements every five minutes or when there has been a change in temperature that is greater than a predefined threshold (e.g., change that is greater than 0.2 Celsius) since the last recorded temperature measurement. The WSD 115 may store sensor data indicative of the sensor measurements it recorded in a data storage 118 (e.g., a non-volatile data storage) of the WSD 115. The WSD 115 may establish a connection with the gateway device 120 to send sensor data indicative of the sensor measurements it recorded to the gateway device 120. In one embodiment, the WSD 115 establishes a connection with the gateway device 120 and communicates with the gateway device 120 using a short-range wireless communication protocol such as Bluetooth Low Energy (BLE). For purposes of illustration, embodiments are primarily described in a context where the WSD 115 and the gateway device 120 use BLE to communicate with each other. It should be understood, however, that other embodiments may use a different short-range wireless communication protocol. In some embodiments, the WSD 115 is implemented as described in further detail with reference to FIG. 11.

The gateway device 120 may be an electronic device that is communicatively situated between the WSD 115 and the management server 140. The gateway device 120 may establish a connection with the WSD 115 (e.g., a BLE connection) and receive sensor data indicative of sensor measurements recorded by the WSD 115 from the WSD 115 over the connection. The gateway device 120 may establish and maintain connections with multiple WSDs and receive sensor data from multiple WSDs over the respective connections. The gateway device 120 may establish a connection with the management server 140 over the WAN 130 and send sensor data that it received from the WSDs over the connection. The connection between the gateway device 120 and the management server 140 may be a wired connection (e.g., Ethernet), a wireless connection (e.g., WiFi, cellular connection, etc.) or a combination of both. In some embodiments, the gateway device 120 is implemented as described in further detail with reference to FIG. 12.

The management server 140 may be a cloud-based server that is able to receive sensor data indicative of sensor measurements recorded by one or more WSDs (e.g., WSD 115) via one or more gateway devices (e.g., gateway device 120). The management server 140 may store sensor data it receives from the one or more WSDs via the one or more gateway devices in a sensor measurement database 142. The figure shows an embodiment in which the sensor measurement database 142 is implemented as a component of the management server 140. However, other embodiments may implement the sensor measurement database 142 external to the management server 140. The management server 140 may make the sensor data stored in the sensor measurement database 142 to end user devices. For example, the management server 140 may send the sensor data stored in the sensor measurement database 142 to the end user device 150 upon receiving a request for the sensor data from the end user device 150. In some embodiments, the management server 140 is implemented as described in further detail with reference to FIG. 10.

The end user device 150 may be an electronic device (e.g., laptop, workstation, smartphone, palm top, mobile phone, tablet, etc.) that may establish a connection with the management server 140 over the WAN 130 to access sensor data (e.g., the sensor data stored in the sensor measurement database 142). The end user device 150 may execute software such as a web browser, File Transfer Protocol (FTP) client, Secure Shell (SSH) client, and/or Telnet client that allows the end user operating the end user device 150 to interact with the management server 410 and access sensor data over the WAN 130. In some embodiments, the end user of the end user device 150 is the owner of the WSD 115 and/or the gateway device 120, while in other embodiments, the end user is an administrator of the devices.

For the sake of simplicity and ease of understanding, the figure shows the sensor network 100 as including a single WSD 115, a single gateway device 120, and a single end user device 150. It should be understood, however, that the sensor network may include (and typically will include) more than one WSD 115, more than one gateway device 120, and/or more than one end user device 150.

For various reasons, the WSD 115 may not be able to establish a connection with the gateway device 120 and/or not be able to maintain a connection with the gateway device 120 once a connection has been established. These reasons may include, for example, the WSD 115 being out of range of the gateway device 120, radio frequency interference, and/or the presence of physical obstacles between the WSD 115 and the gateway device 120 (e.g., concrete walls and objects with higher water content). The WSD 115 may still record sensor measurements even when it is not connected to the gateway device 120 and store sensor data indicative of these sensor measurements in its data storage 118 as backlogged sensor data 119.

In conventional sensor network deployments, when a WSD is able to establish a connection with a gateway device, the WSD may send any backlogged sensor data to the gateway device over the connection. However, in sensor network deployments in which the WSDs and/or gateway devices are battery powered, connections between WSDs and gateway devices are often optimized for power savings, and thus might have a relatively low data throughput. As a result, it may take a long time for the WSD to send the backlogged sensor data to the gateway device, during which the gateway device is prevented from being able to perform other tasks or from entering a lower power state.

To address one or more drawbacks of conventional sensor network deployments, embodiments may use a dynamic connection setting approach, where a WSD 115 uses a "faster" connection setting to send backlogged sensor data to a gateway device 120 when the WSD 115 initially establishes a connection with the gateway device 120, and then switches to using a "slower" (but more power efficient) connection setting to send new sensor data to the gateway device 120 over the connection. According to an embodiment, when the WSD 115 is able to establish a connection with the gateway device 120 (e.g., because the condition that was preventing the WSD 115 from being able to establish a connection with the gateway device 120 is no longer present), the connection is configured to have a first connection setting that allows for higher data throughput compared to a second connection setting. In one embodiment, the first connection setting includes a shorter connection interval compared to the second connection setting, a lower slave latency compared to the second connection setting, or both. The connection interval is the time between two data transfer events. In BLE, the connection interval may range from 7.5 milliseconds to 4 seconds (with increments of 1.25 milliseconds). Slave latency is the number of data transfer events that a slave (e.g., the WSD 115) may skip without losing the connection. In general, a shorter connection interval and lower slave latency will result in higher data throughput and higher power consumption, whereas a longer connection interval and higher slave latency will result in lower data throughput and lower power consumption.

Upon establishing the connection with the gateway device 120, the WSD 115 may send the backlogged sensor data 119 to the gateway device 120 over the connection using the first connection setting (circle '1' in the figure). Once the WSD 115 determines that it has sent all of the backlogged sensor data 119 to the gateway device 120, the WSD 115 may configure the connection to have the second connection setting. This may involve, for example, the WSD 115 sending a request to the gateway device 120 to modify the connection setting of the connection (so that the connection is configured to have the second connection setting) and receiving a corresponding response from the gateway device 120 indicating that the modification of the connection setting is allowed.

The WSD 115 may then send any new sensor data (e.g., sensor data generated by the WSD 115 after the backlogged sensor data 119) to the gateway device 120 over the connection using the second connection setting (circle '2' in the figure). Thus, the WSD 115 may send the backlogged sensor data 119 to the gateway device 120 over the connection using the "faster" first connection setting (to quickly send the backlogged sensor data 119 to the gateway device 120 upon establishing the connection) and send any new sensor data to the gateway device 120 over the connection using the "slower" (but more power efficient) second connection setting (to reduce power consumption once all of the backlogged sensor data 119 has been sent).

The gateway device 120 may send the sensor data it received (both the backlogged sensor data 119 and the new sensor data) to the management server 140. The management server 140 may process and store the sensor data it received from the gateway device 120 (and possibly one or more other gateway devices) in the sensor measurement database 142. The management server 140 may make this sensor data accessible to end user device 150 (and possibly other end user devices). In one embodiment, the management server 140 provides a user interface for display on the end user device 150 that allows the end user of the end user device 150 to explore the sensor data. In one embodiment, the management server 140 generates and sends an alert to the end user device 150 if it detects sensor measurements that meet predefined criteria (the criteria may be defined by the end user or an administrator).

An advantage of the dynamic connection setting approach described herein is that it allows the gateway device 120 to receive the backlogged sensor data 119 more quickly, which allows the gateway device 120 to perform other tasks (e.g., receive backlogged sensor data from other WSDs or send sensor data to the management server 140) or enter a lower power state sooner.

Figure 2:
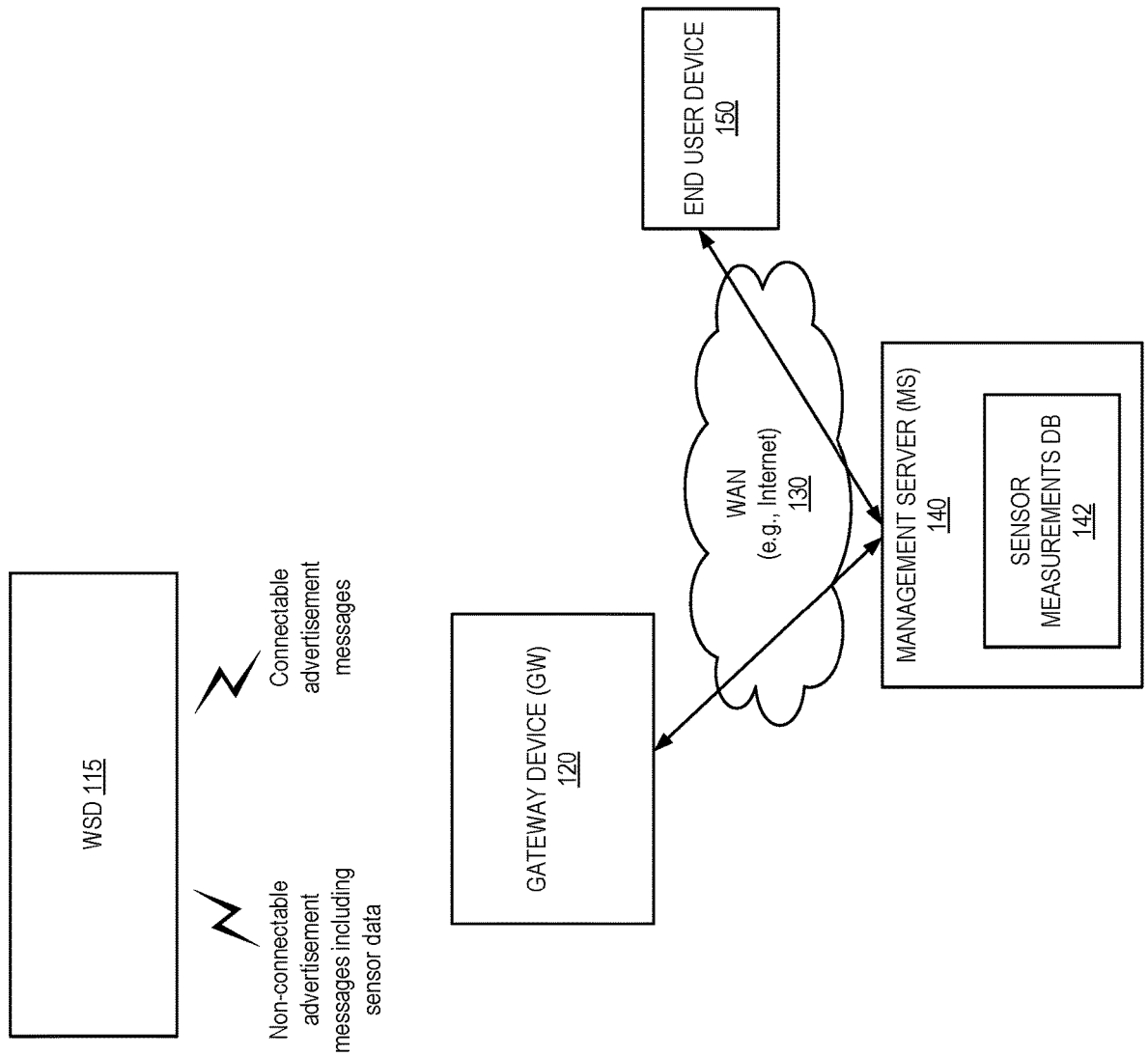
FIG. 2 illustrates a block diagram of an example sensor network in which a WSD may send sensor data in advertisement messages, in accordance with some embodiments.

FIG. 2 illustrates a block diagram of an example sensor network in which a WSD may send sensor data in advertisement messages, in accordance with some embodiments. The network 200 shown in FIG. 2 is similar in many respects to the sensor network 100 shown in FIG. 1 in that it includes a WSD 115, a gateway device 120, a management server 140, and an end user device 150. A general overview of these components has been provided above with reference to FIG. 1, and thus those descriptions are not repeated here for the sake of brevity. The descriptions with reference to FIG. 2 will primarily focus on features related to sending data in advertisement messages to help illustrate embodiments.

The sensor network 200 may have radio asymmetry, where the WSD 115 has higher transmit power than the gateway device 120 (e.g., the WSD transmits at ~18 dBm and the gateway device 120 transmits at ~4 dBm). This radio asymmetry may result in the gateway device 120 being able to receive messages sent by the WSD 115 but the WSD 115 not being able to receive messages sent by the gateway device 120. Such radio asymmetry may make it difficult for WSD 115 and the gateway device 120 to establish a connection with each other and/or make it difficult for the WSD 115 and the gateway device 120 to maintain a connection once it has been established. This may result in lower overall data throughput in the sensor network 200 and/or the gateway device 120 not being able to receive critical sensor data from the WSD 115 in a timely manner.

Embodiments may improve data throughput in the sensor network 200 and/or allow the gateway device 120 to receive critical sensor data from the WSD 115 sooner by including sensor data in advertisement messages. According to an embodiment, as shown in the figure, the WSD 115 sends (broadcasts) non-connectable advertisement messages and connectable advertisement messages when the WSD 115 is not connected to a gateway device 120, where the non-connectable messages include sensor data indicative of sensor measurements recorded by the WSD 115. A connectable advertisement message is a type of advertisement message that can lead to the establishment of a connection (e.g., a gateway device 120 may respond to a connectable advertisement message sent by a WSD 115 by sending a connection request message to the WSD 115 to establish a connection with the WSD 115). In contrast, a non-connectable advertisement message is a type of advertisement message that cannot lead to the establishment of a connection. In one embodiment, the WSD 115 sends the non-connectable advertisement messages (including the sensor data) according to a first periodicity and whenever the WSD detects an occurrence of a predefined event. For example, the WSD 115 may send the non-connectable advertisement messages every 12 minutes and whenever a sensor measurement is outside of what is considered a normal range (what is "normal" can be predefined by an end user or administrator). In one embodiment, the WSD 115 sends the connectable advertisement messages according to a second periodicity that is more frequent compared to the first periodicity. For example, the WSD 115 may send the connectable advertisement messages every eight seconds and send the non-connectable advertisement messages every twelve minutes. In one embodiment, the WSD 115 sends (broadcasts) connectable advertisement messages that include sensor data indicative of sensor measurements recorded by the WSD 115.

In one embodiment, a non-connectable advertisement message that includes sensor data indicative of a sensor measurement includes a sequence number of the sensor measurement. Sequence numbers may be assigned to sensor measurements to indicate an ordering of the sensor measurements. In one embodiment, the sequence number is a monotonically increasing number assigned to sensor measurements. In one embodiment, a non-connectable advertisement message may include sensor data indicative of multiple sensor measurements. For example, a non-connectable advertisement message may include sensor data indicative of multiple sensor measurements of the same type (e.g., multiple temperature measurements) and/or multiple sensor measurements of different types (e.g., one or more temperature measurements and one or more humidity measurements). In one embodiment, when a non-connectable advertisement message includes sensor data indicative of multiple sensor measurements, the non-connectable advertisement message includes the sequence number of one of the sensor measurements but not the sequence numbers of the other sensor measurements, where the sequence numbers of the other sensor measurements may be inferred (by the recipient of the non-connectable advertisement message (e.g., a gateway device 120)) based on the sequence number included in the non-connectable advertisement message. For example, the non-connectable advertisement message may include the sequence number of the first sensor measurement appearing in the advertisement message (e.g., sequence number n) and the sequence numbers of the other sensor measurements appearing after the first sensor measurement may be inferred based on incrementing the sequence number included in the advertisement message by one for each successive sensor measurement in the order that they appear in the advertisement message (e.g., the sequence numbers of the sensor measurements appearing after the first sensor measurement are inferred to be n+1, n+2, and so on). Advertisement messages may have a limited number of bits that can be used for payload and so this may help reduce the amount of bits used when including sensor data in non-connectable advertisement messages.

In one embodiment, a non-connectable advertisement message includes a power generation number in addition to a sequence number of a sensor measurement. The power generation number may be a number that a WSD 115 randomly generates each time the WSD 115 boots up. The inclusion of the power generation number may help the recipient distinguish between different sensor measurements that have the same sequence number (e.g., due to the WSD rebooting and restarting the numbering of sequence numbers). In one embodiment, the power generation number and/or the sequence number has a length of four bytes.

When the gateway device 120 receives a non-connectable advertisement message that includes sensor data from the WSD 115, the gateway device 120 may extract the sensor data from the non-connectable advertisement message. The gateway device 120 may also extract the sequence numbers of sensor measurements indicated by the sensor data from the non-connectable advertisement message. In one embodiment, if the non-connectable advertisement message includes sensor data indicative of multiple sensor measurements and the non-connectable advertisement message only includes the sequence number of one of the sensor measurements, the gateway device 120 infers the sequence numbers of the other sensor measurements, as described above. The gateway device 120 may then send the sensor data and corresponding sequence numbers to the management server 140.

When the gateway device 120 receives a connectable advertisement message from the WSD 115, the gateway device 120 may attempt to establish a connection with the WSD 115. This may involve, for example, the gateway device 120 sending a connection request message to the WSD 115 in response to receiving the connectable advertisement message. If the connection is successfully established, the WSD 115 may send sensor data to the gateway device 120 over the connection. The WSD 115 may also send sequence numbers (and also power generation numbers in some embodiments) of the sensor measurements indicated by the sensor data to the gateway device 120 over the connection. The sensor data sent over the connection may include sensor data that the WSD 115 previously included in non-connectable advertisement messages since the WSD 115 may not be aware of which of the non-connectable advertisement messages the gateway device 120 was able to receive. The gateway device 120 may then send the sensor data it received from the WSD 115 (and the corresponding sequence numbers (and power generation numbers in some embodiments)) to the management server 140.

The management server 140 may process and store the sensor data it received from the gateway device 120 (and sensor data received from one or more other gateway devices, which may include sensor data that was included in advertisement messages as well as sensor data that was sent over a connection) in the sensor measurement database 142. This may involve, for example, ordering the sensor measurements indicated by the sensor data and/or deduplicating sensor measurements indicated by the sensor data based on the sequence numbers. The management server 140 may then make the sensor data accessible to end user device 150 (and possibly other end user devices).

An advantage of sending sensor data in advertisement messages is that it allows the gateway device 120 to potentially receive sensor data sent by the WSD 115 even when the gateway device 120 is unable to establish a connection with the WSD 115, which may increase the overall data throughput of the sensor network and/or allow the gateway device 120 to receive critical sensor data from a WSD 115 in a more timely manner (e.g., without having to wait until a connection with the WSD 115 is established). This may be particularly advantageous in situations where the gateway device 120 is able to receive messages sent by the WSD 115 but the WSD 115 is not able to receive messages sent by the gateway device 120 (e.g., due to radio asymmetry). While embodiments have been primarily described where sensor data is included in non-connectable advertisement messages, in some embodiments, sensor data can be included in connectable advertisement messages to achieve similar benefits.

Figure 3:
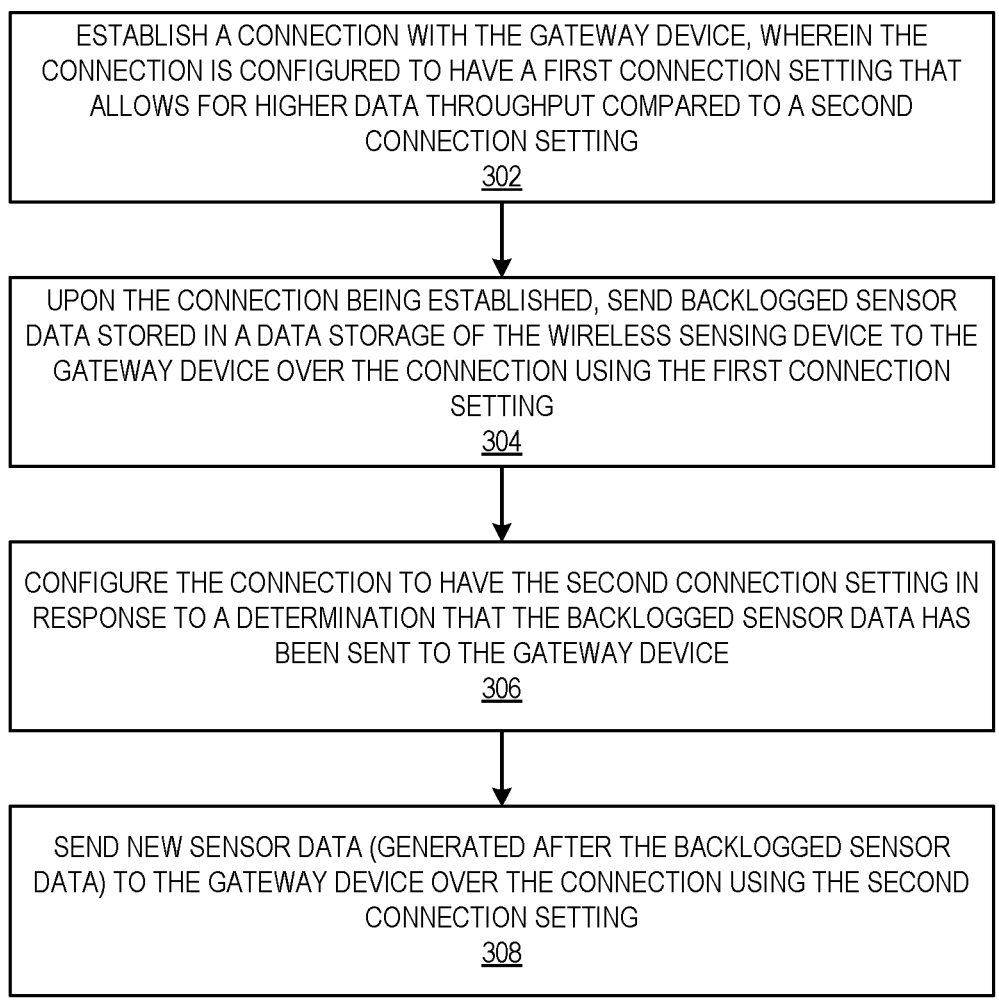
FIG. 3 illustrates a flow diagram of example operations that may be performed by a WSD to send sensor data to a gateway device using a dynamic connection setting, in accordance with some embodiments.

FIG. 3 illustrates a flow diagram of example operations that may be performed by a WSD to send sensor data to a gateway device using a dynamic connection setting, in accordance with some embodiments. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

At operation 302, the WSD establishes a connection with the gateway device, wherein the connection is configured to have a first connection setting that allows for higher data throughput compared to a second connection setting. In one embodiment, the connection is a BLE connection. In one embodiment, the second connection setting includes a longer connection interval compared to the first connection setting. Additionally or alternatively, in one embodiment, the second connection setting includes a higher slave latency compared to the first connection setting.

At operation 304, upon the connection being established, the WSD sends backlogged sensor data stored in a data storage of the WSD to the gateway device over the connection using the first connection setting. In one embodiment, the backlogged sensor data includes data indicative of sensor measurements recorded by the WSD that the WSD stored in the data storage of the WSD because the WSD was unable to establish a connection with the gateway device.

At operation 306, the WSD configures the connection to have the second connection setting in response to a determination that the backlogged sensor data has been sent to the gateway device. In one embodiment, configuring the connection to have the second connection setting includes sending a request to the gateway device to modify a connection setting of the connection and receiving a response from the gateway device indicating that modification of the connection setting of the connection is allowed.

At operation 308, the WSD sends new sensor data (that was generated by the WDS after the backlogged sensor data) to the gateway device over the connection using the second connection setting.

Figure 4:
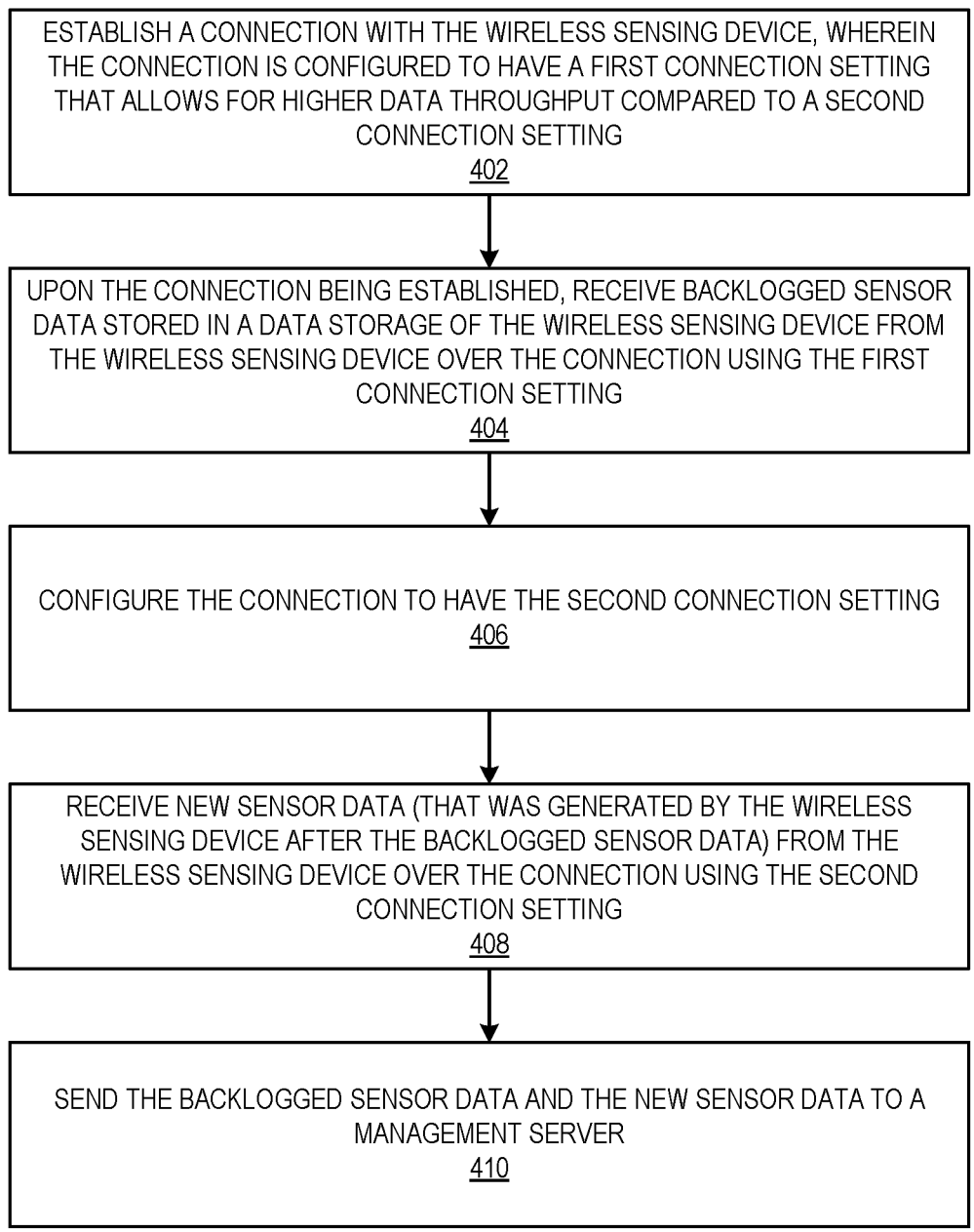
FIG. 4 illustrates a flow diagram of example operations that may be performed by a gateway device to receive sensor data from a WSD using a dynamic connection setting, in accordance with some embodiments.

FIG. 4 illustrates a flow diagram of example operations that may be performed by a gateway device to receive sensor data from a WSD using a dynamic connection setting, in accordance with some embodiments.

At operation 402, the gateway device establishes a connection with the WSD, wherein the connection is configured to have a first connection setting that allows for higher data throughput compared to a second connection setting. In one embodiment, the connection is a BLE connection. In one embodiment, the second connection setting includes a longer connection interval compared to the first connection setting. Additionally or alternatively, in one embodiment, the second connection setting includes a higher slave latency compared to the first connection setting.

At operation 404, upon the connection being established, the gateway device receives backlogged sensor data stored in a data storage of the WSD from the WSD over the connection using the first connection setting. In one embodiment, the backlogged sensor data includes data indicative of sensor measurements recorded by the WSD that the WSD stored in the data storage of the WSD because the WSD was unable to establish a connection with the gateway device.

At operation 406, the gateway device configures the connection to have the second connection setting. In one embodiment, configuring the connection to have the second connection setting includes receiving a request from the WSD to modify a connection setting of the connection and sending a response to the WSD indicating that modification of the connection setting of the connection is allowed.

At operation 408, the gateway device receives new sensor data (that was generated by the WSD after the backlogged sensor data) from the WSD over the connection using the second connection setting.

At operation 410, the gateway device sends the backlogged sensor data and the new sensor data to a management server.

Figure 5:
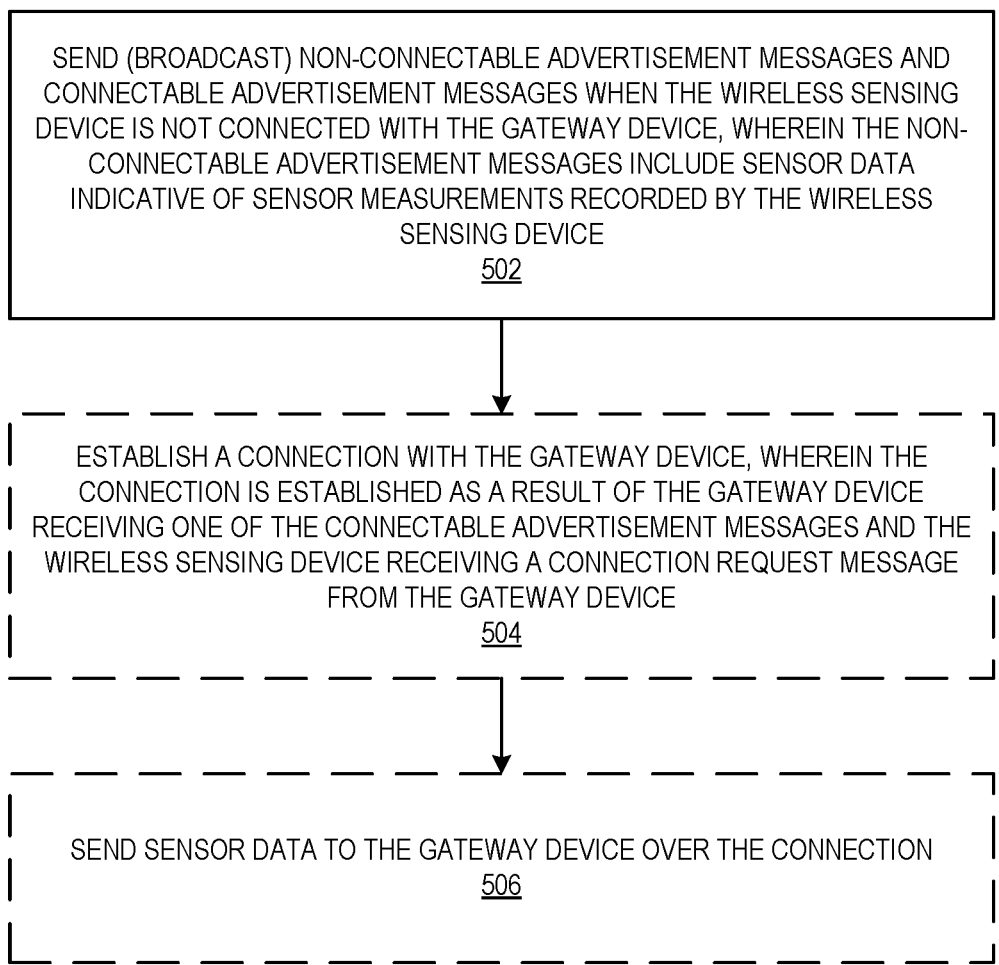
FIG. 5 illustrates a flow diagram of example operations that may be performed by a WSD to send sensor data in advertisement messages, in accordance with some embodiments.

FIG. 5 illustrates a flow diagram of example operations that may be performed by a WSD to send sensor data in advertisement messages, in accordance with some embodiments.

At operation 502, the WSD sends (broadcasts) non-connectable advertisement messages and connectable advertisement messages when the WSD is not connected with the gateway device, wherein the non-connectable advertisement messages include sensor data indicative of sensor measurements recorded by the WSD. In one embodiment, the transmit power of the WSD is higher than the transmit power of the gateway device. In one embodiment, the non-connectable advertisement messages are sent according to a first periodicity and whenever an occurrence of a predefined event is detected. In one embodiment, the connectable advertisement messages are sent according to a second periodicity that is more frequent compared to the first periodicity. In one embodiment, one of the non-connectable advertisement messages includes sensor data indicative of a first sensor measurement recorded by the WSD and a sequence number of the first sensor measurement. In one embodiment, the one of the non-connectable advertisement messages further includes sensor data indicative of one or more other sensor measurement recorded by the WSD, wherein the one of the non-connectable advertisement messages does not include sequence numbers of the one or more other sensor measurements but the sequence numbers of the one or more other sensor measurements can be inferred by the gateway device based on the sequence number of the first sensor measurement.

In one embodiment, at operation 504, the WSD establishes a connection with the gateway device, wherein the connection is established as a result of the gateway device receiving one of the connectable advertisement messages and the WSD receiving a connection request message from the gateway device.

In one embodiment, at operation 506, the WSD sends sensor data to the gateway device over the connection.

Figure 6:
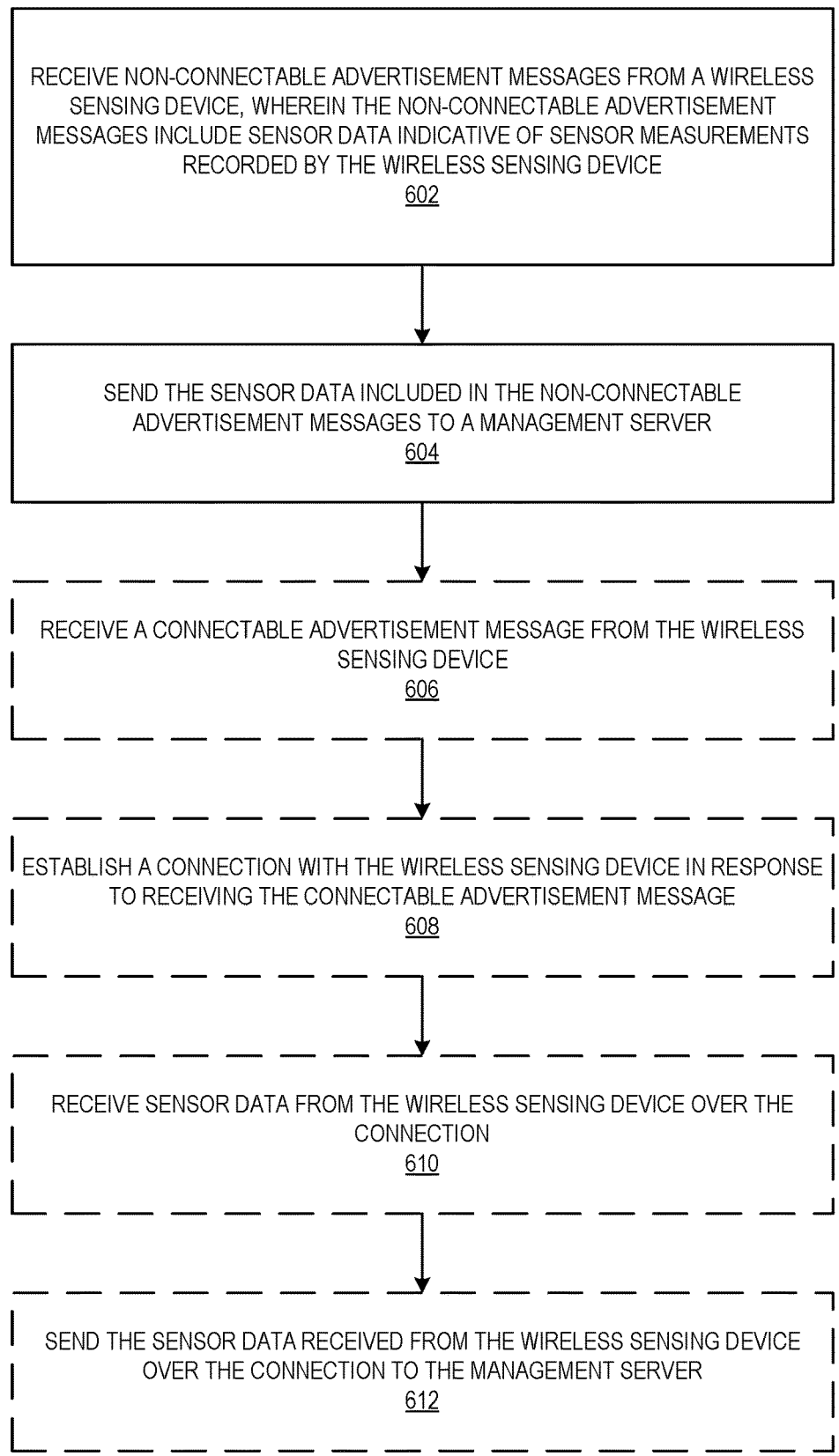
FIG. 6 illustrates a flow diagram of example operations that may be performed by a gateway device to receive sensor data in advertisement messages, in accordance with some embodiments.

FIG. 6 illustrates a flow diagram of example operations that may be performed by a gateway device to receive sensor data in advertisement messages, in accordance with some embodiments.

At operation 602, the gateway device receives non-connectable advertisement messages from a WSD, wherein the non-connectable advertisement messages include sensor data indicative of sensor measurements recorded by the WSD. In one embodiment, the transmit power of the WSD is higher than the transmit power of the gateway device. In one embodiment, one of the non-connectable advertisement messages includes sensor data indicative of a first sensor measurement recorded by the WSD and a sequence number of the first sensor measurement. In one embodiment, the one of the non-connectable advertisement messages further includes sensor data indicative of one or more other sensor measurement recorded by the WSD, wherein the one of the non-connectable advertisement messages does not include sequence numbers of the one or more other sensor measurements but the sequence numbers of the one or more other sensor measurements are inferred by the gateway device based on the sequence number of the first sensor measurement.

At operation 604, the gateway device sends the sensor data included in the non-connectable advertisement messages to a management server.

In one embodiment, at operation 606, the gateway device receives a connectable advertisement message from the WSD. In one embodiment, the connectable advertisement message is one of the connectable advertisement messages sent by the WSD. The WSD may have sent the non-connectable advertisement messages according to a first periodicity (and/or due to detecting an occurrence of a predefined event (e.g., a significant change in sensor measurement)) and sent the connectable advertisement messages according to a second periodicity that is more frequent compared to the first periodicity.

In one embodiment, at operation 608, the gateway device establishes a connection with the WSD in response to receiving the connectable advertisement message.

In one embodiment, at operation 610, the gateway device receives sensor data from the WSD over the connection.

In one embodiment, at operation 612, the gateway device sends the sensor data received from the WSD over the connection to the management server.

Figure 7:
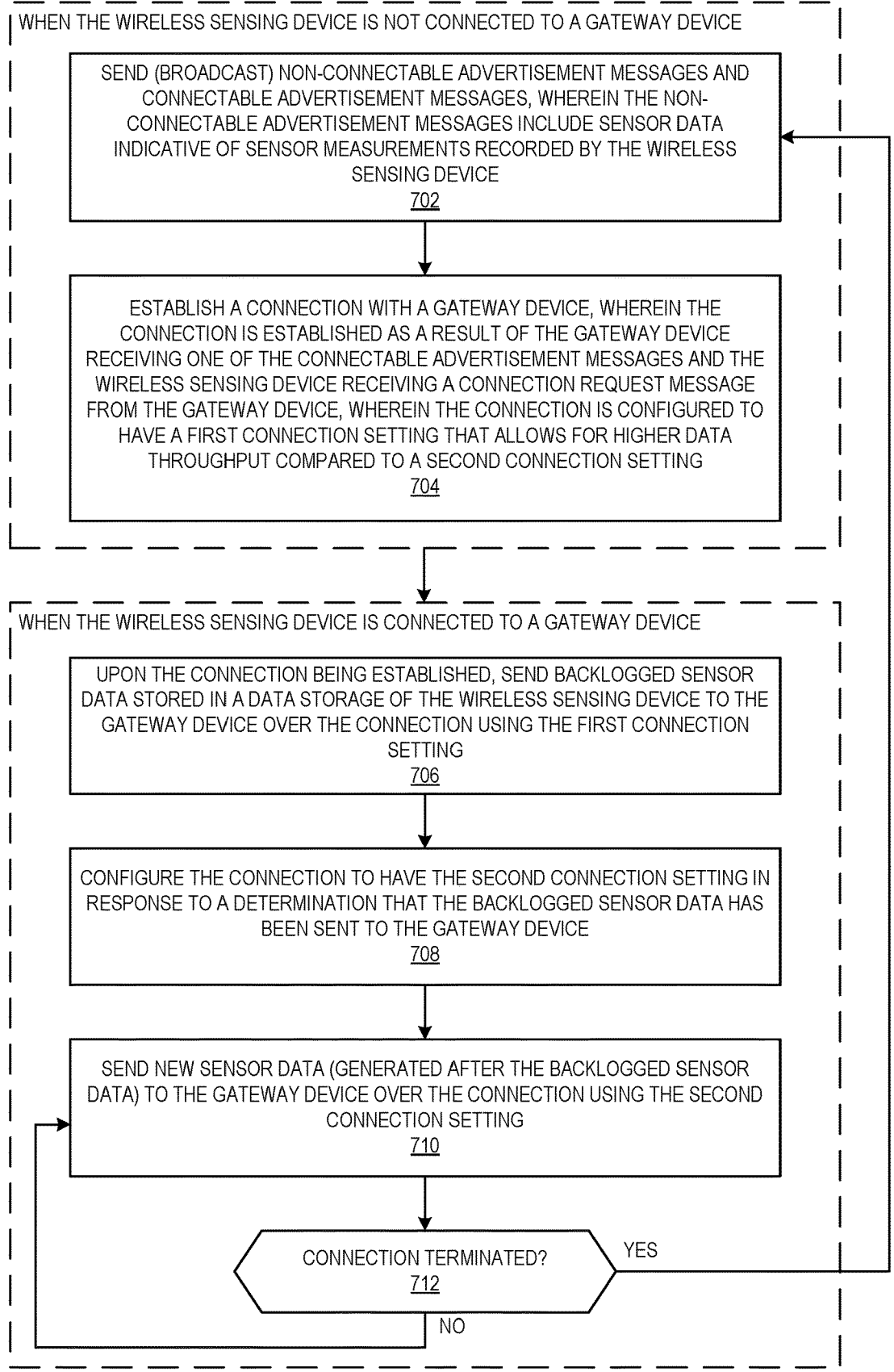
FIG. 7 illustrates a flow diagram of example operations that may be performed by a WSD to send sensor data to a gateway device, in accordance with some embodiments.

FIG. 7 illustrates a flow diagram of example operations that may be performed by a WSD to send sensor data to a gateway device, in accordance with some embodiments.

When the WSD is not connected to a gateway device, it may perform operations 702 and 704. At operation 702, the WSD sends (broadcasts) non-connectable advertisement messages and connectable advertisement messages, wherein the non-connectable advertisement messages include sensor data indicative of sensor measurements recorded by the WSD.

At operation 704, the WSD establishes a connection with a gateway device, wherein the connection is established as a result of the gateway device receiving one of the connectable advertisement messages and the WSD receiving a connection request message from the gateway device, wherein the connection is configured to have a first connection setting that allows for higher data throughput compared to a second connection setting.

When the WSD is connected to the gateway device, it may perform operations 706, 708, 710, and 712. At operation 706, upon the connection being established, the WSD sends backlogged sensor data stored in a data storage of the WSD to the gateway device over the connection using the first connection setting.

At operation 708, the WSD configures the connection to have the second connection setting in response to a determination that the backlogged sensor data has been sent to the gateway device.

At operation 710, the WSD sends new sensor data (that was generated by the WDS after the backlogged sensor data) to the gateway device over the connection using the second connection setting.

At operation 712, the WSD determines whether the connection has been terminated. If the connection has not been terminated, then the flow may return to operation 710, where the WSD continues to send new sensor data to the gateway device over the connection using the second connection setting. Otherwise, if the connection has been terminated, then the flow may move to operation 702 where the WSD sends (broadcasts) non-connectable advertisement messages and connectable advertisement messages, wherein the non-connectable advertisement messages include sensor data indicative of sensor measurements recorded by the WSD.

Figure 8:
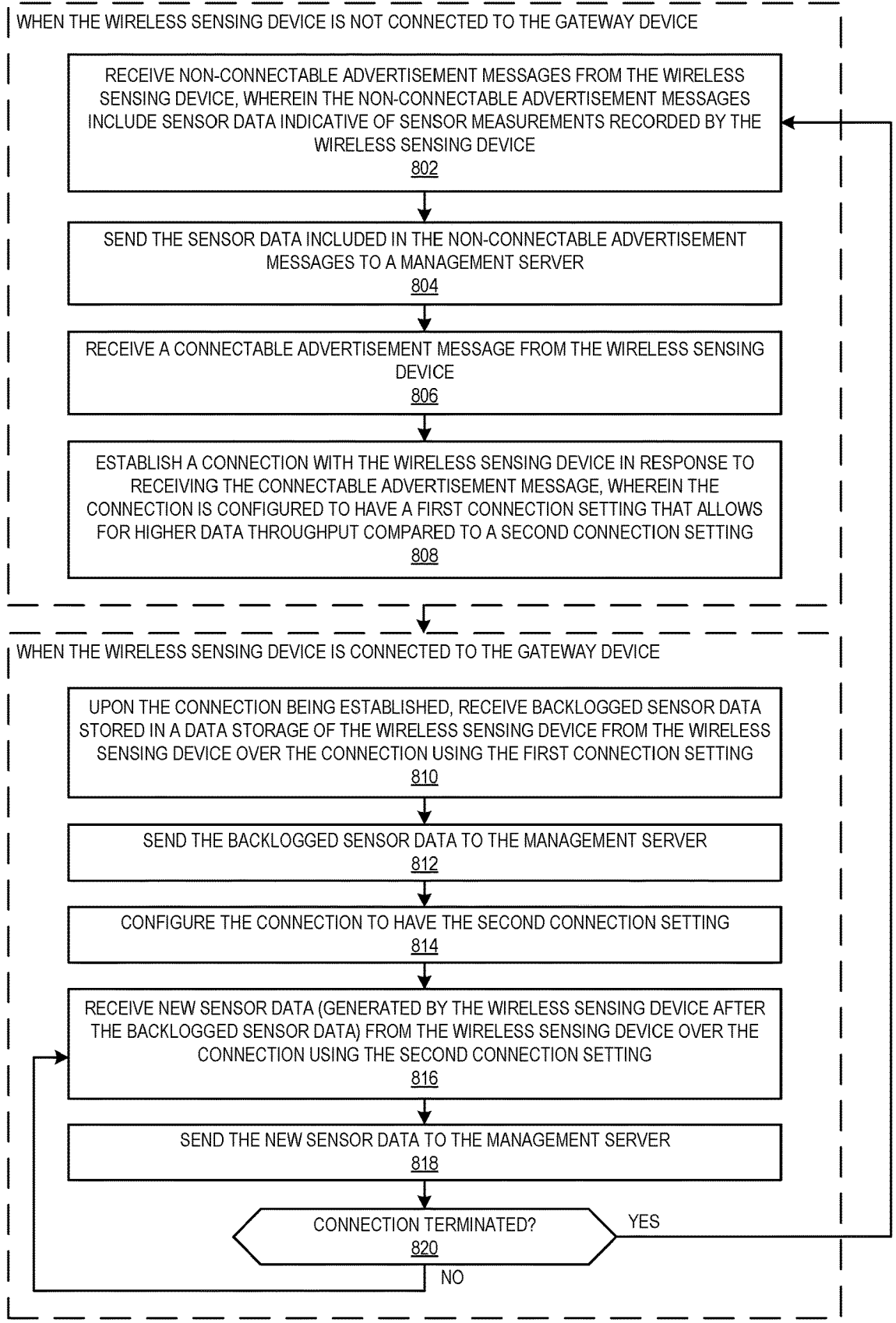
FIG. 8 illustrates a flow diagram of example operations that may be performed by a gateway device to receive sensor data from a WSD, in accordance with some embodiments.

FIG. 8 illustrates a flow diagram of example operations that may be performed by a gateway device to receive sensor data from a WSD, in accordance with some embodiments.

When the WSD is not connected to the gateway device, the gateway device may perform operations 802, 804, 806, and 808. At operation 802, the gateway device receives non-connectable advertisement messages from the WSD, wherein the non-connectable advertisement messages include sensor data indicative of sensor measurements recorded by the WSD.

At operation 804, the gateway device sends the sensor data included in the non-connectable advertisement messages to a management server.

At operation 806, the gateway device receives a connectable advertisement message from the WSD.

At operation 808, the gateway device establishes a connection with the WSD in response to receiving the connectable advertisement message, wherein the connection is configured to have a first connection setting that allows for higher data throughput compared to a second connection setting.

When the WSD is connected to the gateway device, the gateway device may perform operations 810, 812, 814, 816, 818, and 820. At operation 810, upon the connection being established, the gateway device receives backlogged sensor data stored in a data storage of the WSD from the WSD over the connection using the first connection setting.

At operation 812, the gateway device sends the backlogged sensor data to the management server.

At operation 814, the gateway device configures the connection to have the second connection setting.

At operation 816, the gateway device receives new sensor data (that was generated by the WSD after the backlogged sensor data) from the WSD over the connection using the second connection setting.

At operation 818, the gateway device sends the new sensor data to the management server.

At operation 820, the gateway device determines whether the connections has been terminated. If the connection has not been terminated, then the flow may return to operation 816, where the gateway device continues to receive new sensor data from the WSD over the connection using the second connection setting. Otherwise, if the connection has been terminated, then the flow may move to operation 802, where the gateway device receives non-connectable advertisement messages from the WSD, wherein the non-connectable advertisement messages include sensor data indicative of sensor measurements recorded by the WSD.

Figure 9:
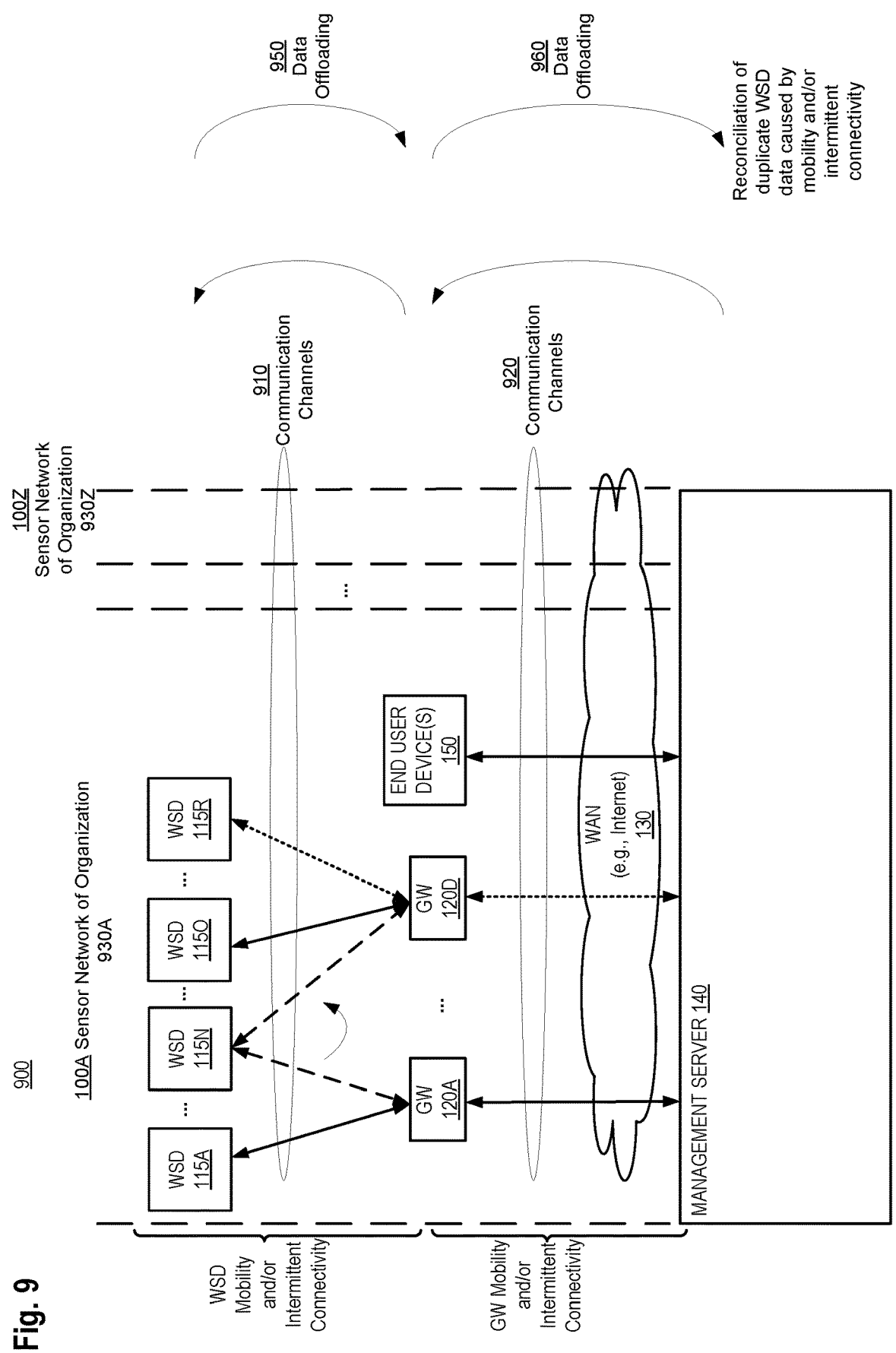
FIG. 9 illustrates a block diagram of exemplary sensor networks, in accordance with some embodiments.

FIG. 9 illustrates a block diagram of exemplary sensor networks 900, in accordance with some embodiments. The management server 140 provides a sensor network service to one or more organizations. As illustrated in FIG. 9, the management server 140 may be coupled, through the WAN 130, to a plurality of gateway devices and wireless sensing devices forming multiple sensor networks (e.g., 100A-100Z) belonging to respective organizations (e.g., 930A-930Z). Each organization possesses a set of wireless sensing devices and gateways for monitoring physical events (e.g., monitoring the temperature of refrigerated goods being transported, monitoring fleets of vehicles by recording location, movement and/or acceleration information, monitoring humidity and/or temperature at various locations within a room or a building, etc.).

Sensor Network 100A of organization 930A is an exemplary deployment of a sensor network including a plurality of wireless sensing devices and gateway devices. The sensor network 100A includes a plurality of WSDs coupled with one or more gateway devices. For example, WSDs 115A to 115N are coupled to gateway device (GW) 120A, WSDs 1150 to 115R are coupled with GW 120D, etc. While four WSDs, and two gateway devices are illustrated, the sensor network 100A may include more WSDs and gateway devices. Each one of the gateway devices may be mobile or stationary. For example, the GW 120D may be a mobile gateway device located within a vehicle transporting goods, which also includes one or more mobile WSDs that can connect to the gateway device. The sensor network service enables the offload of data (operations 950 and 960) from the wireless sensing devices (e.g., 115A-115N) to the management server 140 through a communication channel 910 between the GWs (e.g., GW 110A-110D) and the WSDs and through a communication channel 920 between the management server 140 and the GWs of the sensor network 100A.

The sensor network service may be a multi-tenant service and may process and manage data from various sensor networks (e.g., 100A, 100Z) belonging to different organizations while ensuring that data recorded by a WSD of a first organization (e.g., 930A) is not transmitted to a user of the second organization (e.g., 930Z).

In some embodiments, one or more of the WSDs 115, the gateway devices 120, and the management server 140 may perform operations for supporting the dynamic connection setting approach and/or the approach of including sensor data in advertisement messages, as described herein.

The gateway devices, wireless sensing devices, and the management server described with reference to figures are electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 10:
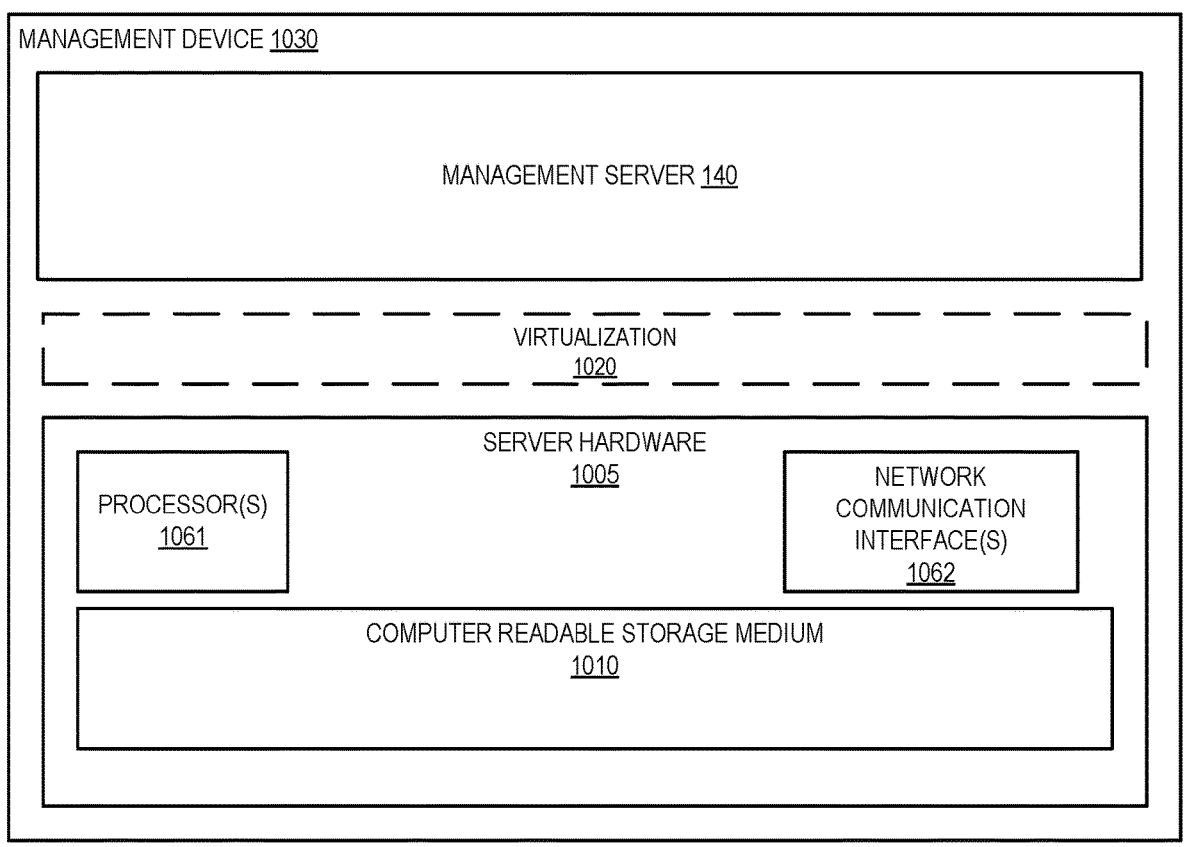
FIG. 10 illustrates a block diagram for an exemplary management device that can be used in some embodiments.

FIG. 10 illustrates a block diagram for an exemplary management device that can be used in some embodiments. The management device 1030 may implement a management server 140. The management server 140 may be a web or cloud server, or a cluster of servers, running on server hardware 1005. In one embodiment, the management server 140 works for both single and multi-tenant installations, meaning that multiple organizations with different administrators may have wireless sensing devices and gateway devices managed by the same management server 140.

Management device 1030 includes server hardware 1005. Server hardware 1005 includes processors 1061, network communication interfaces 1062, and a computer readable storage medium 1010. The computer readable storage medium 1010 may include code that when executed by the processors 1061 causes the management server 140 to perform operations for supporting the dynamic connection setting approach and/or the approach of including sensor data in advertisement messages, as described herein.

The communication interfaces 1062 allow the management device 1030 to communicate with other devices. In one embodiment, the communication interfaces 1062 include a BLE transceiver, an IEEE 802.11 transceiver, an infrared transceiver, a wireless cellular telephony transceiver (e.g., 2G, 3G, 4G), or another type of transceiver. It will be appreciated that one or more buses may be used to interconnect the various components shown in FIG. 10.

While one embodiment does not implement virtualization, alternative embodiments may use different forms of virtualization—represented by a virtualization layer 1020. In these embodiments, the management server 140 and the hardware that executes it form a virtual management server.

Figure 11:
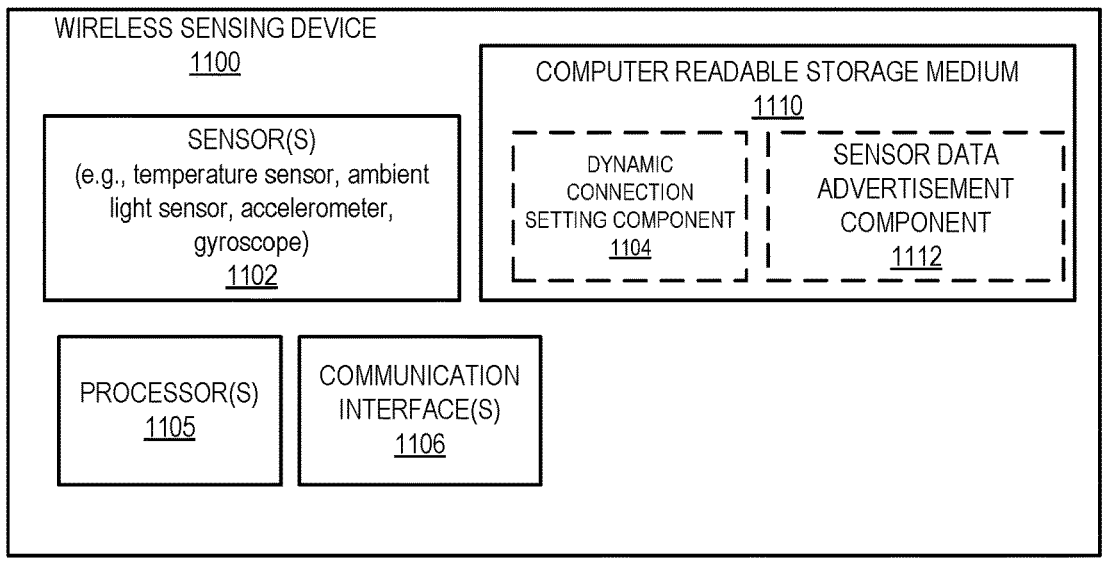
FIG. 11 illustrates a block diagram of an exemplary wireless sensing device 1100 that can be used in some embodiments.

FIG. 11 illustrates a block diagram of an exemplary wireless sensing device 1100 that can be used in some embodiments. Wireless sensing device 1100 includes one or more processors 1105 and connected system components (e.g., multiple connected chips). The wireless sensing device 1100 includes computer readable storage medium 1110, which is coupled to the processor(s) 1105. The computer readable storage medium 1110 may be used for storing data, metadata, and programs for execution by the processor(s) 1105. For example, the depicted computer readable storage medium 1110 may store a dynamic connection setting component 1104 and/or a sensor data advertisement component 1112 that, when executed by the processor(s) 1105, causes the WSD 1100 (e.g., WSD 115) to perform operations for implementing/supporting the dynamic connection settings approach and/or the approach of including sensor data in advertisement messages, as described herein. While the dynamic connection setting component 1104 and the sensor data advertisement component 1112 are illustrated as code stored on the computer readable storage medium, in other embodiments one or both of these components may be implemented in hardware or in a combination of hardware and software.

The WSD 1100 also includes one or more sensor(s) 1102 to detect physical events and store sensor measurements in the computer readable storage medium 1110 in response to the detection of the physical events. In some exemplary embodiments, the one or more sensor(s) include at least one of a temperature sensor, an ambient light sensor, an accelerometer, and a gyroscope, etc.

The WSD 1100 also includes one or more communication interfaces 1106, which allow the WSD 1100 to communicate with other devices. In one embodiment, the communication interfaces 1106 include a BLE transceiver, an IEEE 802.11 transceiver, an infrared transceiver, a wireless cellular telephony transceiver (e.g., 2G, 3G, 4G), or another type of transceiver. It will be appreciated that one or more buses may be used to interconnect the various components shown in FIG. 11.

It will be appreciated that additional components, not shown, may also be part of the WSD 1100, and, in certain embodiments, fewer components than that shown in FIG. 11 may also be used in a WSD 1100.

Figure 12:
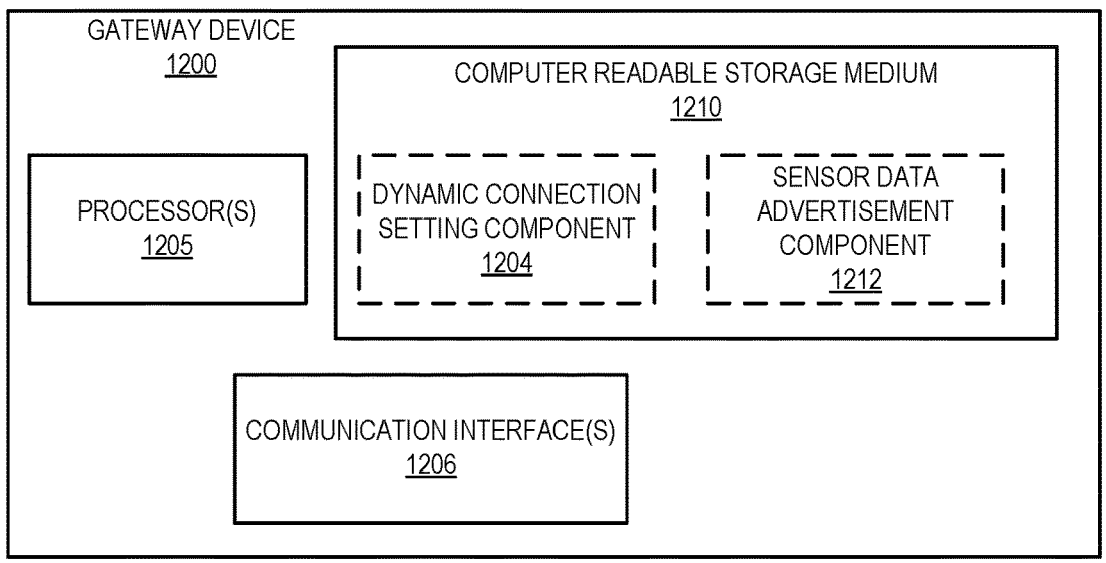
FIG. 12 illustrates a block diagram of an exemplary gateway device that can be used in some embodiments.

FIG. 12 illustrates a block diagram of an exemplary gateway device that can be used in some embodiments. Gateway device 1200 includes one or more processors 1205 and connected system components (e.g., multiple connected chips). The gateway device 1200 includes computer readable storage medium 1210, which is coupled to the processor(s) 1205. The computer readable storage medium 1210 may be used for storing data, metadata, and programs for execution by the processor(s) 1205. For example, the depicted computer readable storage medium 1210 may store a dynamic connection setting component 1204 and/or a sensor data advertisement component 1212 that, when executed by the processor(s) 1205, causes the gateway device 1200 (e.g., gateway device 120) to perform operations for implementing/supporting the dynamic connection setting approach and/or the approach of including sensor data in advertisement messages, as described herein. While the dynamic connection setting component 1204 and the sensor data advertisement component 1212 are illustrated as code stored on the computer readable storage medium, in other embodiments one or both of these components may be implemented in hardware or in a combination of hardware and software.

The gateway device 1200 also includes one or more communication interfaces 1206, which allow the gateway device 1200 to communicate with other devices. In one embodiment, the communication interfaces 1206 include a BLE transceiver, an IEEE 802.11 transceiver, an infrared transceiver, a wireless cellular telephony transceiver (e.g., 2G, 3G, 4G), or another type of transceiver. It will be appreciated that one or more buses may be used to interconnect the various components shown in FIG. 12.

It will be appreciated that additional components, not shown, may also be part of the gateway device 1200, and, in certain embodiments, fewer components than that shown in FIG. 12 may also be used in a gateway device 1200.

While some components of the WSD, gateway device, or the management server are illustrated as code stored on the computer readable storage medium, in other embodiments the components may be implemented in hardware or in a combination of hardware and software.

In the above description, numerous specific details such as resource partitioning/sharing/duplication embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

While the flow diagrams in the figures show a particular order of operations performed by certain embodiments, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a wireless sensing device to send sensor data to a gateway device using a dynamic connection setting, the method comprising:
    establishing a connection with the gateway device, wherein the connection is configured to have a first connection setting that allows for higher data throughput compared to a second connection setting;
    upon the connection being established, sending backlogged sensor data stored in a data storage of the wireless sensing device to the gateway device over the connection using the first connection setting;
    configuring the connection to have the second connection setting in response to a determination that the backlogged sensor data has been sent to the gateway device; and
    sending new sensor data generated after the backlogged sensor data to the gateway device over the connection using the second connection setting.

2. The method of claim 1, wherein configuring the connection to have the second connection setting includes sending a request to the gateway device to modify a connection setting of the connection and receiving a response from the gateway device indicating that modification of the connection setting of the connection is allowed.

3. The method of claim 1, wherein the connection is a Bluetooth Low Energy (BLE) connection.

4. The method of claim 3, wherein the second connection setting includes a longer connection interval compared to the first connection setting.

5. The method of claim 3, wherein the second connection setting includes a higher slave latency compared to the first connection setting.

6. The method of claim 1, wherein the backlogged sensor data includes data indicative of sensor measurements recorded by the wireless sensing device that the wireless sensing device stored in the data storage of the wireless sensing device because the wireless sensing device was unable to establish a connection with the gateway device.

7. The method of claim 1, further comprising:
    sending non-connectable advertisement messages and connectable advertisement messages when the wireless sensing device is not connected with the gateway device, wherein the non-connectable advertisement messages include sensor data indicative sensor measurements recorded by the wireless sensing device.

8. The method of claim 7, wherein the non-connectable advertisement messages further include sequence numbers of the sensor measurements.

9. The method of claim 7, wherein the non-connectable advertisement messages are sent according to a first periodicity and whenever an occurrence of a predefined event is detected.

10. The method of claim 9, wherein the connectable advertisement messages are sent according to a second periodicity that is more frequent compared to the first periodicity.

11. The method of claim 1, further comprising:
    sending connectable advertisement messages that include sensor data indicative of sensor measurements recorded by the wireless sensing device.

12. A wireless sensing device configured to send sensor data to a gateway device using a dynamic connection setting, the wireless sensing device comprising:
    one or more processors; and
    a non-transitory computer readable storage medium to store instructions, which when executed by the one or more processors, causes the wireless sensing device to:
        establish a connection with the gateway device, wherein the connection is configured to have a first connection setting that allows for higher data throughput compared to a second connection setting,
        upon the connection being established, send backlogged sensor data stored in a data storage of the wireless sensing device to the gateway device over the connection using the first connection setting,
        configure the connection to have the second connection setting in response to a determination that the backlogged sensor data has been sent to the gateway device, and
        send new sensor data generated after the backlogged sensor data to the gateway device over the connection using the second connection setting.

13. The wireless sensing device of claim 12, wherein the instructions, when executed by the one or more processors, further causes the wireless sensing device to:
    send non-connectable advertisement messages and connectable advertisement messages when the wireless sensing device is not connected with the gateway device, wherein the non-connectable advertisement messages include sensor data indicative sensor measurements recorded by the wireless sensing device.

* * * * *